(12) United States Patent
Chiesi

(10) Patent No.: US 11,262,245 B2
(45) Date of Patent: Mar. 1, 2022

(54) METHOD FOR PROCESSING AN IMAGE

(71) Applicant: Schneider Electric Industries SAS, Rueil Malmaison (FR)

(72) Inventor: Laurent Chiesi, Réaumont (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 78 days.

(21) Appl. No.: 16/660,470

(22) Filed: Oct. 22, 2019

(65) Prior Publication Data

US 2020/0149972 A1 May 14, 2020

(30) Foreign Application Priority Data

Nov. 9, 2018 (FR) ...................................... 1860396

(51) Int. Cl.
*G01J 5/22* (2006.01)
*G01J 5/00* (2006.01)
*G01J 5/20* (2006.01)

(52) U.S. Cl.
CPC .......... *G01J 5/22* (2013.01); *G01J 2005/0077* (2013.01); *G01J 2005/202* (2013.01)

(58) Field of Classification Search
CPC . G01J 5/22; G01J 2005/0077; G01J 2005/202
See application file for complete search history.

(56) References Cited

U.S. PATENT DOCUMENTS 10,015,425 B2    7/2018   Saragaglia et al.
2005/0077469 A1*   4/2005   Kaushal .............. B60R 21/0152
                                                        250/330

(Continued)

FOREIGN PATENT DOCUMENTS

EP       2012101       1/2009
EP       2940991       11/2015

(Continued)

OTHER PUBLICATIONS

French Preliminary Search Report and Written Opinion for French Patent Application Publication No. FR1860396, dated Jul. 1, 2019, 9 pages.

*Primary Examiner* — Blake C Riddick
(74) *Attorney, Agent, or Firm* — Locke Lord LLP; Peter N. Fill; Judy R. Naamat

(57) ABSTRACT

A method for processing a raw image characterized by raw measurements $S_p(i,j)$ that are associated with active bolometers $B_{pix\_}(i,j)$ of an imager, which bolometers are arranged in a matrix array, the imager being at an ambient temperature $T_{amb}$ and furthermore comprising blind bolometers $B_{b\_}(k)$, the method, which is executed by a computer that is provided with a memory, comprising the following steps:

a) a step of calculating the electrical resistances $R_{Tc}(i,j)$ and $R_{Tc}(k)$, at the temperature $T_{amb}$, of the active and blind bolometers, respectively, from their respective electrical resistances $R_{Tr}(i,j)$ and $R_{Tr}(k)$ at a reference temperature $T_r$, said resistances being stored in the memory;

b) a step of determining the temperatures $T_{sc}(i,j)$ actually measured by each of the active bolometers $B_{pix\_}(i,j)$ from the electrical resistances calculated in step a) and from the raw measurements $S_p(i,j)$.

12 Claims, 3 Drawing Sheets

(56) References Cited

U.S. PATENT DOCUMENTS

| | | | |
|---|---|---|---|
| 2009/0008555 A1* | 1/2009 | Dupont | G01J 5/22 250/338.1 |
| 2009/0008556 A1 | 1/2009 | Dupont et al. | |
| 2009/0194696 A1* | 8/2009 | Mizrahi | G01J 5/20 250/338.1 |
| 2009/0212220 A1* | 8/2009 | Mizrahi | G01J 5/20 250/352 |
| 2010/0224787 A1* | 9/2010 | Huppertz | G01J 5/22 250/370.15 |
| 2010/0237245 A1 | 9/2010 | King et al. | |
| 2011/0068272 A1 | 3/2011 | Dupont et al. | |
| 2011/0290986 A1* | 12/2011 | Yon | G01J 5/24 250/208.2 |
| 2011/0297828 A1* | 12/2011 | Weisbach | H04N 5/35581 250/330 |
| 2012/0037805 A1 | 2/2012 | Dupont et al. | |
| 2013/0218500 A1* | 8/2013 | Durand | G01J 5/24 702/87 |
| 2014/0091220 A1* | 4/2014 | Li | G01J 5/20 250/340 |
| 2014/0231651 A1* | 8/2014 | Kim | G01J 1/46 250/349 |
| 2014/0239180 A1* | 8/2014 | Vilain | G01J 5/22 250/338.4 |
| 2015/0319387 A1* | 11/2015 | Saragaglia | G01J 5/22 348/164 |
| 2017/0089764 A1* | 3/2017 | Lee | G01J 5/22 |
| 2017/0111015 A1* | 4/2017 | Robert | H03F 3/45071 |
| 2017/0191868 A1* | 7/2017 | Kurth | G01J 5/0245 |
| 2017/0219436 A1 | 8/2017 | Simolon et al. | |
| 2018/0080830 A1* | 3/2018 | Daraio | G01N 27/048 |
| 2019/0335118 A1* | 10/2019 | Simolon | H04N 5/33 |
| 2019/0368941 A1* | 12/2019 | Aziz | H04N 5/361 |
| 2019/0373192 A1* | 12/2019 | Cannata | H04N 5/3658 |

FOREIGN PATENT DOCUMENTS

| | | |
|---|---|---|
| WO | WO2010125281 | 11/2010 |
| WO | WO2018132743 | 7/2018 |

* cited by examiner

METHOD FOR PROCESSING AN IMAGE

TECHNICAL FIELD

The present invention relates to a method for processing a raw image collected by an imager provided with a matrix array of bolometers. In particular, the processing method according to the present invention is intended to correct the nonuniformities due to the dispersions in the characteristics of the bolometers of the imager.

The present invention also relates to a computer program capable of implementing all of the steps of the method according to the present invention.

The invention lastly relates to an imager comprising bolometers and a computer implementing the computer program.

BACKGROUND

An infrared detector known in the prior art in general comprises bolometers organized into a matrix array of n rows and m columns.

When they are exposed to a scene with a view to acquiring an image, these bolometers, which are sensitive to the temperature of the scene, see their electrical resistance vary. In other words, the current flowing through each of the bolometers is dependent on the temperature of the scene, but also on the ambient temperature.

In particular, the measurement $S_p(i,j)$ of the bolometers $B_{pix\_}(i,j)$ of a matrix array of bolometers varies according to the following relationship:

$$S_p(i,j) = \text{Resp}(T_{amb})(T_{scene} - T_{amb}) + S_{0,Tamb}$$

where:

$T_{amb}$ is the ambient temperature, and more particularly the temperature of the imager;

$T_{scene}$ is the temperature of the scene seen by the bolometer, $\text{Resp}(T_{amb})$ is the responsivity of the bolometer, the latter depending on the ambient temperature;

$S_{0,Tamb}$ is the value output by the bolometer for a scene temperature equal to the ambient temperature.

The term $\text{Resp}(T_{amb})$ depends on the materials used to produce the bolometer and on the architecture of the latter.

The deduction of the scene temperature requires the ambient temperature $T_{amb}$ to be known, and hence the imager is in general also provided with a temperature sensor.

The imager may also be provided with additional bolometers, called blind bolometers, which are not exposed to the scene. The current flowing through the latter then depends only on the ambient temperature.

Thus, in such a configuration, the determination of the variation in the resistance of an exposed bolometer is based on a differential measurement between the currents flowing through said exposed bolometer and a blind bolometer.

In general, each column of the matrix array of bolometers is associated with a blind bolometer that is employed for each of the bolometers of said column during the differential measurement. However, other configurations may be envisaged, and in particular the use of a single common blind bolometer for a plurality of columns of bolometers.

The raw image (FIG. 1) of a scene capable of being obtained with such a device is in general not exploitable, and requires additional processing.

In particular, the image illustrated in FIG. 1 reveals the arrangement of the bolometers of the detector, and more particularly a nonuniformity ("pixelization effect"). The origin of this effect is in the substantial dispersion of the electrical resistances from one bolometer to the next.

The image also has a columnar aspect that is due to the dispersion of the electrical resistances between the blind bolometers.

In order to mitigate these problems, various solutions have been envisaged.

It has in particular been proposed to place a mechanical shutter on the imager. In particular, the mechanical shutter is placed in front of the detector so as to collect a reference image relative to the ambient temperature, which is subsequently subtracted from the image of the scene.

This arrangement, which is relatively simple in principle, is however unsatisfactory.

Specifically, the implementation of a shutter, and the motorization that is associated therewith, create problems both of cost and of bulk.

Moreover, the reference image must be refreshed when the ambient temperature varies.

Alternatively, it has been proposed to characterize the temperature response of the detector, and in particular of each of its bolometers.

This characterization comprises reference measurements at various temperatures with all of the bolometers of the imager closed with a shutter.

The reference measurements then allow the variation in temperature of each of the bolometers to be determined and thus calibration tables that are stored in a memory space of the detector to be constructed.

Thus, in operation, the detector corrects the raw image by subtracting, for each bolometer, values obtained by interpolation from the calibration tables.

This solution, which allows the effect of nonuniformity of the image from one bolometer to the next to be decreased, is however unsatisfactory.

Specifically, the procedure used to acquire the reference measurements is time-consuming, and increases the cost of manufacture of the detector.

Moreover, the memory space dedicated to saving the calibration tables, because of the cost that is associated therewith, is undesirable.

Lastly, a third method based on algorithms allowing the nonuniformity of the image to be corrected has been proposed in EP2940991B1 and US2010237245A1.

These known prior-art methods are also unsatisfactory.

Specifically, these methods are generally tedious to implement, and their robustness is debatable.

Moreover, these methods require powerful computing means to be employed, which have a corresponding negative influence on the costs of the detectors in which they are employed.

One aim of the present invention is to provide a method for processing images collected by an imager provided with bolometers that is simpler than the known prior art techniques, and that does not require mechanical parts and the automation that is associated therewith to be employed.

Another aim of the invention is to provide a method allowing the columnar effect observed in a raw image to be corrected.

SUMMARY OF THE INVENTION

The aims of the present invention are at least partially achieved with a method for processing a raw image characterized by raw measurements $S_p(i,j)$ that are associated with active bolometers $B_{pix\_}(i,j)$ of an imager, which bolometers are arranged in a matrix array of n rows and m columns, the imager being at an ambient temperature $T_{amb}$ and furthermore comprising blind bolometers $B_{b\_}(k)$, each blind bolometer $P_{b\_}(k)$ being employed for the differential measurement of the active bolometers $B_{pix\_}(i,j)$ of at least one column of bolometers that is specific thereto, each blind bolometer $B_{b\_}(k)$ advantageously being associated with one single column of active bolometers $B_{pix\_}(i,j)$, the method, which is executed by a computer that is provided with a memory, comprising the following steps:

a) a step of calculating the electrical resistances $R_{Tc}(i,j)$ and $R_{Tc}(k)$, at the temperature $T_{amb}$, of the active and blind bolometers, respectively, from their respective electrical resistances $R_{Tr}(i,j)$ and $R_{Tr}(k)$ at a reference temperature $T_r$, said resistances being stored in the memory;

b) a step of determining the temperatures $T_{sc}(i,j)$ actually measured by each of the active bolometers $B_{pix\_}(i,j)$ from the electrical resistances calculated in step a) and from the raw measurements $S_p(i,j)$.

According to one embodiment, step a) of calculating the electrical resistances $R_{Tc}(i,j)$ and $R_{Tc}(k)$, at the temperature $T_{amb}$, is executed based on an activation energy $E_a$ representative of the material forming each of the active and blind bolometers $B_{pix\_}(i,j)$ and $B_{b\_}(k)$.

According to one embodiment, the electrical resistances $R_{Tamb}(i,j)$ and $R_{Tamb}(k)$ are calculated using the following relationships:

$$R_{Tamb}(i,j) = R_{Tr}(i,j) \cdot e^{\frac{qE_a}{k}\left(\frac{1}{T_{amb}} - \frac{1}{T_r}\right)}$$

and $$R_{Tamb}(k) = R_{Tr}(k) \cdot e^{\frac{qE_a}{k}\left(\frac{1}{T_{amb}} - \frac{1}{T_r}\right)}$$

According to one embodiment, the temperature $T_{sc}(i,j)$ actually measured by an active bolometer $B_{pix\_}(i,j)$ respects the following relationship:

$$S_P(i,j) = \text{Resp}(T_{amb},i,j)(T_{sc}(i,j) - T_{amb}) + S_{0,T_{amb}}(i,j)$$

where:
Resp($T_c$,i,j) is the responsivity of the bolometer;
$S_{0,Tamb}(i,j)$ is the value output by the active bolometer $B_{pix\_}(i,j)$ for a temperature actually measured equal to the ambient temperature.

According to one embodiment, the value $S_{0,Tamb}(i,j)$ associated with an active bolometer $B_{pix\_}(i,j)$ of a column is dependent on the difference between the currents $I_{0,pix}(i,j)$ and $I_{0,b}(j)$ capable of flowing through said active bolometer $B_{pix\_}(i,j)$ and the blind bolometer $B_{b\_}(k)$ with which the column is associated, respectively, for a temperature actually measured equal to the ambient temperature.

According to one embodiment, step a) is preceded by a step a1) of acquiring raw measurements $S_p(i,j)$ with capacitive transimpedance amplifiers that are arranged so that all of the active bolometers $B_{pix\_}(i,j)$ of each column and the blind bolometer $B_{b\_}(k)$ with which said column is associated are connected to a negative input of one of the capacitive transimpedance amplifiers, the positive input of said amplifier receiving a reference voltage.

According to one embodiment, switching devices, in particular transistors, controlled by the computer are interposed between each of the, active and blind, bolometers and the capacitive transimpedance amplifier to which the latter are connected.

According to one embodiment, prior to the implementation of the method, a step of measuring the electrical resistances $R_{Tr}(i,j)$ and $R_{Tr}(k)$ is executed.

According to one embodiment, the determination of the electrical resistance $R_{Tr}(i,j)$ and $R_{Tr}(k)$ of an active bolometer $B_{pix\_}(i,j)$ of a column or of the blind bolometer $B_{b\_}(k)$ with which said column is associated comprises a measurement of the current capable of flowing through the bolometer in question.

According to one embodiment, the measurement of the current capable of flowing through the bolometer in question comprises closing the switch interposed between said bolometer in question and the capacitive transimpedance amplifier, the other switches being kept open.

The invention also relates to a computer program which, when it is implemented by a computer, allows the method according to the present invention to be executed.

The invention also relates to an imager provided with
active bolometers $B_{pix\_}(i,j)$, of an imager, said bolometers being arranged in a matrix array of n rows and m columns;
blind bolometers $B_{b\_}(k)$, each blind bolometer $P_{b\_}(k)$ being employed for the differential measurement of the active bolometers $B_{pix\_}(i,j)$ of at least one column of bolometers that is specific thereto, each blind bolometer $B_{b\_}(k)$ advantageously being associated with a single column of active bolometers $B_{pix\_}(i,j)$;
a computer equipped with the computer program according to the present invention.

The invention also relates to the use of the imager according to the present invention for detection, in particular the detection of people, in a room.

BRIEF DESCRIPTION OF THE DRAWINGS

Other features and advantages will become apparent from the following description of a method for processing an image, given by way of nonlimiting examples, with reference to the appended drawings, in which.

DETAILED DESCRIPTION OF PARTICULAR EMBODIMENTS

The present description will now be described with reference to FIGS. 1 to 4b.

Figure 1:
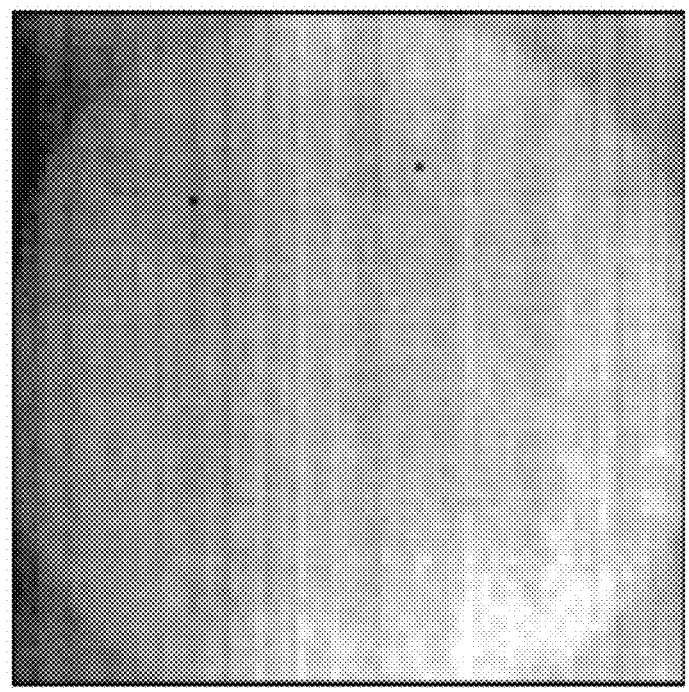
FIG. 1 is a raw image of a scene obtained with an imager provided with bolometers arranged in a matrix array of 80 rows by 80 columns.
Figure 2:
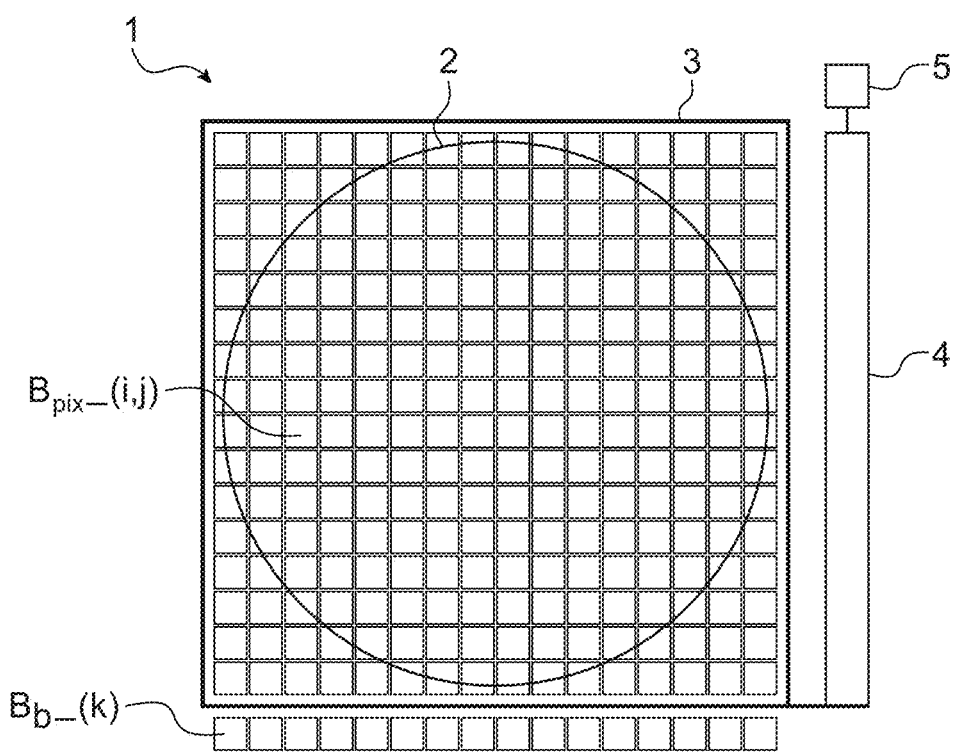
FIG. 2 is a schematic representation of an imager provided with a lens mounted on a diaphragm capable of being implemented according to the present invention.

FIG. 2 shows an imager provided with a plurality of active bolometers, denoted $B_{pix\_}(i,j)$, arranged in a matrix array of n rows (denoted "$L_i$") and m columns (denoted "$C_j$").

A bolometer indexed i, j corresponds to a bolometer placed at the intersection of row i with column j.

The imager of FIG. 2 may also comprise a plurality of blind bolometers $B_{b\_}(k)$.

Each blind bolometer $P_{b\_}(k)$ is employed for the differential measurement of the active bolometers $B_{pix\_}(i,j)$ of at least one column of bolometers that is specific thereto.

In particular, each blind bolometer $B_{b\_}(k)$ is associated with a single column ($C_j$) of active bolometers $B_{pix\_}(i,j)$.

The imager 1 furthermore comprises a computer 4 equipped with a computational processor intended to execute the various steps of the method according to the present invention.

The computer may also comprise a memory space for saving the raw measurements, and/or parameters useful to the operation of the imager 1.

Lastly, the imager 1 may comprise a temperature probe 5 intended to evaluate the temperature of the environment in which said detector is found. The temperature probe may, for example, comprise a PN junction.

Figure 3:
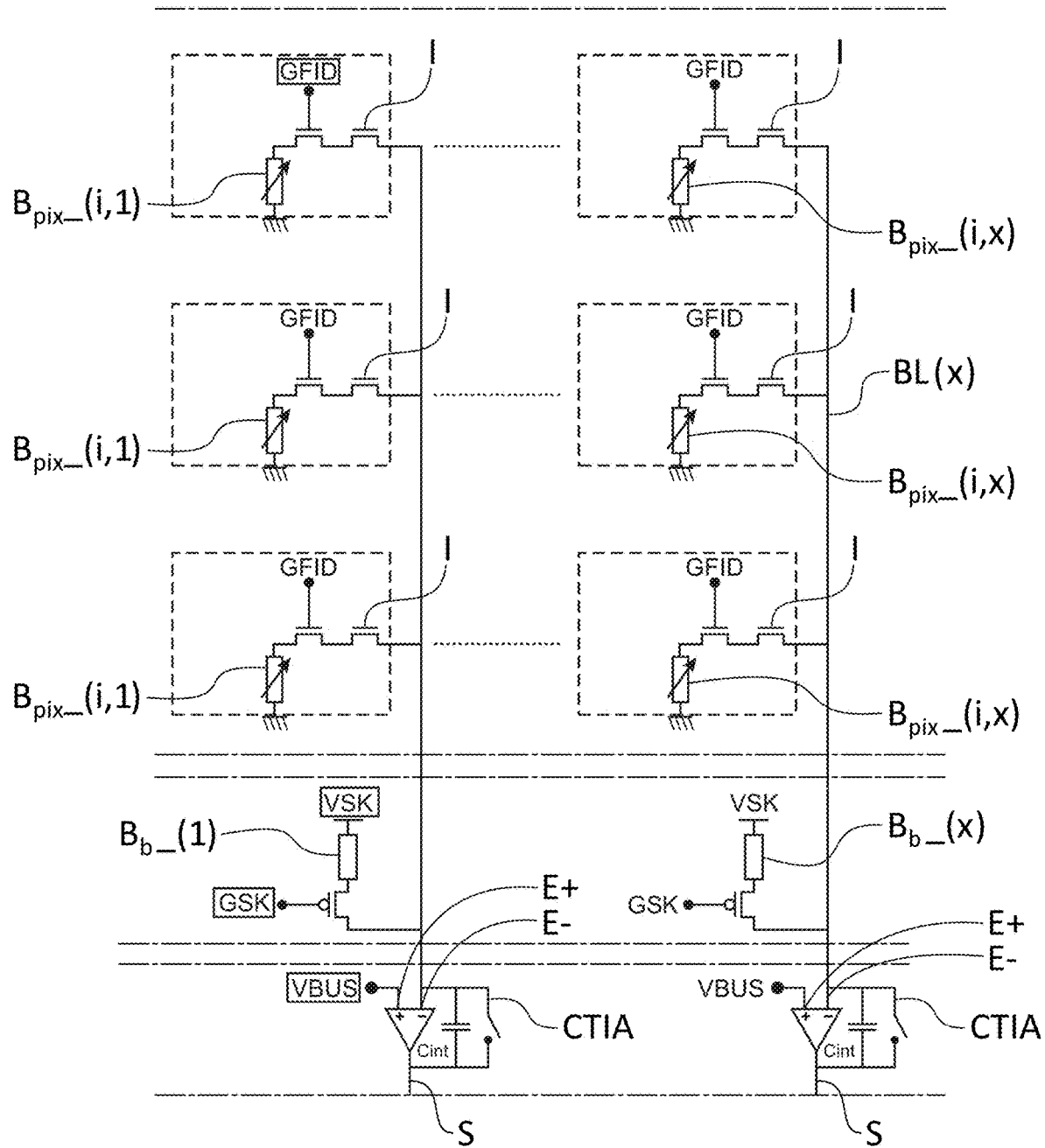
FIG. 3 is a representation of an equivalent circuit diagram of the imager, FIG. 3 in particular showing a first column $C_1$, and an $X^{th}$ column $C_X$ of active bolometers $B_{pix\_}(i,j)$.

FIG. 3 is a representation of an equivalent circuit diagram of the imager 1. FIG. 3 in particular shows a first column $C_1$, and an $X^{th}$ column $C_X$ of active bolometers $B_{pix\_}(i,j)$.

Each of the active bolometers $B_{pix\_}(i,j)$ of a column and the blind bolometer $B_{b\_}(j)$ with which said column is associated, is connected to a common line $BL(j)$ via a switching device I, and in particular a transistor, controlled by the computer.

The end of each of the common lines $BL(k)$ is connected to a negative input $E^-$ of a capacitive transimpedance amplifier CTIA. The positive input $E^+$ is for its part raised to a reference voltage $V_{bus}$.

The use of the switching devices I allows each of the active or blind bolometers to be addressed individually and thus their output signal to be measured with one of the capacitive transimpedance amplifiers CTIA.

The method according to the present invention proposes to correct the defects of a raw image characterized by raw measurements $S_p(i,j)$ associated with the active bolometers $B_{pix\_}(i,j)$.

The method according to the present invention comprises a step a) of calculating the electrical resistances $R_{Tc}(i,j)$ and $R_{Tc}(k)$, at the temperature $T_{amb}$, of the active and blind bolometers $B_{pix\_}(i,j)$ and $B_{b\_}(k)$, respectively.

These electrical resistances are in particular calculated from the respective electrical resistances $R_{Tr}(i,j)$ and $R_{Tr}(k)$, of said bolometers, at a reference temperature $T_r$, said resistances being stored in the memory of the computer.

The electrical resistances $R_{Tr}(i,j)$ and $R_{Tr}(k)$ of the active bolometers $B_{pix\_}(i,j)$ and of the blind bolometers $B_{b\_}(k)$, respectively, at the reference temperature $T_r$, may be determined prior to step a), in a step a1).

For example, a step a1) is executed during the manufacture of the imager.

Step a1) then comprises a first substep a1$_1$) of determining the electrical resistances of the reference temperature of each of the active bolometers $B_{pix\_}(i,j)$.

The first substep a1$_1$) employs a mask kept at the reference temperature $T_r$ and placed in front of the imager 1 (it will be understood that the imager is also kept at the reference temperature $T_r$).

The current flowing through each of the active bolometers $B_{pix\_}(i,j)$ is then measured individually.

In particular, the measurement of the current $I_{pix\_}(a,b)$ of a given active bolometer $B_{pix\_}(a,b)$ comprises closing the switching device connecting it to the common line $BL(b)$, the other switches being kept open. The switches GSK associated with the blind bolometers are also kept open so as to cancel out the current capable of flowing therethrough.

Figure 4A:
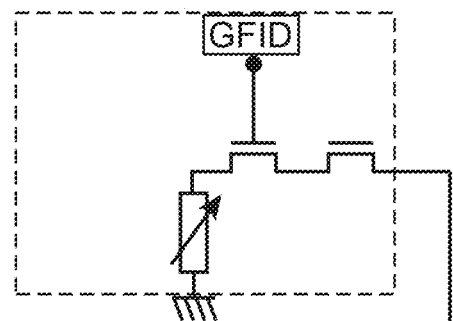
FIG. 4a shows an equivalent circuit diagram resulting from the closure of a single switching device of a given active bolometer.
Figure 4A:
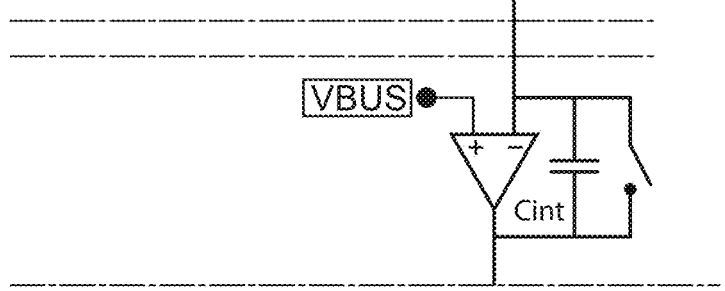

The equivalent circuit diagram resulting from this configuration is shown in FIG. 4a.

The voltage $V_{CTIA}$ at the output S of the capacitive transimpedance amplifier CTIA associated with column "b" respects the following relationship (1):

$$V_{CTIA} = V_{BUS} + \frac{T_{int}}{C_{int}} \cdot I_{pix\_}(a,b) \qquad (1)$$

$C_{int}$ being a capacitance of the amplifier CTIA and $T_{int}$ an integration time in the step of measuring the current $I_{pix\_}(a,b)$.

Moreover, the current $I_{pix\_}(a,b)$ is dependent on the geometric and electrical characteristics of the bolometer and on the characteristics controlling the latter.

More particularly, the current $I_{pix\_}(a,b)$ also respects the following relationship (2):

$$I_{pix\_}(a,b) = \frac{1}{2} \cdot k_n \cdot \frac{W}{L} \cdot (GFID - R_{Tr\_}(a,b) \cdot I_{pix\_}(a,b) - V_{th,N})^2 \qquad (2)$$

$\mu n$ being the electron mobility in the material forming the bolometer in question;

$C_{ox}$ being the capacitance per unit area of the gate of the transistor controlling the bolometer;

$k_n = \mu n \cdot C_{ox}$ being an NMOS gain factor;

W/L being the width-to-length ratio of the channel of the transistor controlling the bolometer; and $V_{th,N}$ being the threshold voltage of the NMOS transistor controlling the bolometer.

The reference electrical resistance $R_{Tr}(i,j)$ at the reference temperature $T_r$ is thus deduced from relationships (1) and (2).

Step a1) then comprises a second substep a1$_2$) of determining the electrical resistances, at the reference temperature, of each of the blind bolometers $B_{b\_}(k)$.

Substep a1$_2$) is similar to substep a1$_1$).

In particular, the second substep a1$_2$) also employs the mask kept at the reference temperature $T_r$ and placed in front of the imager 1 (it will be understood that the imager is also kept at the reference temperature $T_r$).

The current flowing through each of the blind bolometers $B_{b\_}(k)$ is then measured individually.

In particular, the measurement of the current $I_{b\_}(l)$ of a given blind bolometer $B_{b\_}(l)$ comprises closure of the transistor GSK controlling the latter in order to connect it to the common line $BL(l)$, the other switches being kept open.

Figure 4B:
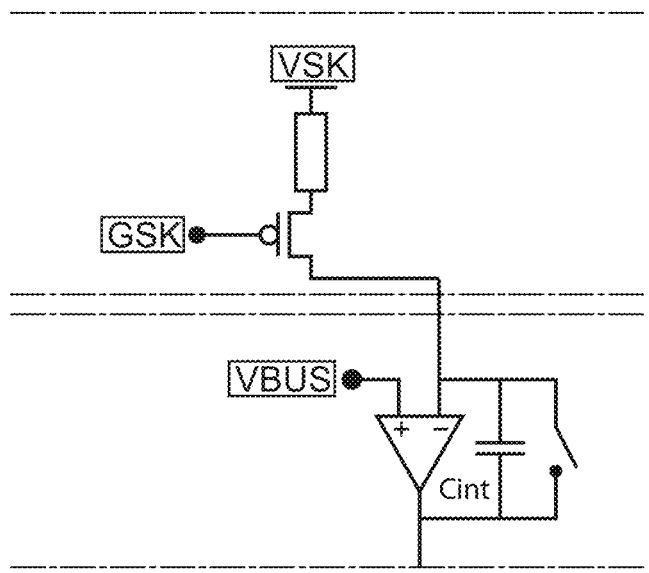
FIG. 4b shows an equivalent circuit diagram resulting from the closure of a single control transistor of a given blind bolometer, and no current flowing through the other active and blind bolometers.

The equivalent circuit diagram resulting from this configuration is presented in FIG. 4b.

The voltage $V_{CTIA}$ at the output S of the capacitive transimpedance amplifier CTIA associated with the column "l" respects the following relationship (3):

$$V_{CTIA} = V_{BUS} + \frac{T_{int}}{C_{int}} \cdot I_{b\_}(l) \qquad (3)$$

Moreover, the current $I_{b\_}(l)$ depends on the geometric and electrical characteristics of the bolometer and on the characteristics controlling the latter.

More particularly, the current $I_{b\_}(l)$ also respects the following relationship, relationship (4):

$$I_{b\_}(l) = \frac{1}{2} \cdot k_p \cdot \frac{W}{L} \cdot (V_{th,P} + VSK - R_{Tr\_}(l) \cdot I_{b\_}(l))^2 \qquad (4)$$

$\mu_p$ being the hole mobility in the material forming the bolometer in question;

$C_{ox}$ being the capacitance per unit area of the gate of the transistor controlling the bolometer;

$K_p = \mu_p \cdot C_{ox}$ being a PMOS gain factor;

W/L being the width-to-length ratio of the channel of the transistor controlling the bolometer; and $V_{th,P}$ being the threshold voltage of the PMOS transistor controlling the bolometer.

The reference electrical resistance $R_{Tr}(1)$ at the reference temperature $T_r$ is thus deduced from relationships (3) and (4).

The determination of the reference electrical resistances $R_{Tr}(i,j)$ and $R_{Tr}(k)$ thus employs components usually integrated into an imager. In other words, it is not necessary to modify the imager in order to implement the method according to the present invention.

The calculation of the electrical resistances at the ambient temperature $T_{amb}$ may then involve an activation energy $E_a$ representative of the material forming each of the active and blind bolometers $B_{pix\_}(i,j)$ and $B_b(k)$.

More particularly, the electrical resistances $R_{Tamb}(i,j)$ and $R_{Tamb}(k)$ are calculated using the following relationships:

$$R_{Tamb}(i,j) = R_{Tr}(i,j) \cdot e^{\frac{qE_a}{k}\left(\frac{1}{T_{amb}} - \frac{1}{T_r}\right)} \quad (5)$$

and $$R_{Tamb}(k) = R_{Tr}(k) \cdot e^{\frac{qE_a}{k}\left(\frac{1}{T_{amb}} - \frac{1}{T_r}\right)} \quad (6)$$

The method according to the present invention also comprises a step b) of determining the temperatures $T_{sc}(i,j)$ actually measured by each of the active bolometers $B_{pix\_}(i,j)$ based on the electrical resistances calculated in step a) and on the raw measurements $S_p(i,j)$.

In particular, the temperature $T_{sc}(i,j)$ actually measured by an active bolometer $B_{pix\_}(i,j)$ respects the following relationship (7):

$$S_P(i,j) = \text{Resp}(T_{amb},i,j)T_{sc}(i,j) - T_{amb}) + S_{0,Tamb}(i,j) \quad (7)$$

where:

$\text{Resp}(T_c,i,j)$ is the responsivity of the bolometer;

$S_{0,Tamb}(i,j)$ is the value output by the active bolometer $B_{pix\_}(i,j)$ for a temperature actually measured equal to the ambient temperature.

In this respect, the value $S_{0,Tamb}(i,j)$ associated with an active bolometer $B_{pix\_}(i,j)$ of a column $C_j$ is dependent on the difference between the currents $I_{0,pix}(i,j)$ and $I_{0,b}(j)$ capable of flowing through said active bolometer $B_{pix\_}(i,j)$ and the blind bolometer $B_{b\_}(j)$ with which the column Cj is associated, respectively, for a temperature actually measured equal to the ambient temperature.

In other words, for each of the active bolometers, the term $S_{0,Tamb}(i,j)$ respects the following relationship, relationship (8):

$$S_{0,Tamb}(i,j) = VBUS - \frac{T_{int}}{C_{int}} \cdot (I_{0,b(j)} - I_{0,pix(i,j)}) \quad (8)$$

the currents $I_{0,pix}(i,j)$ and $I_{0,b}(j)$ depending on the electrical resistances $R_{Tamb}(i,j)$ and $R_{Tamb}(j)$, respectively.

It is therefore possible to deduce, from relationships (7) and (8), the temperature $T_{sc}(i,j)$ actually measured by each of the bolometers, using the following relationship:

$$T_{sc(i,j)} = \frac{S_{P(i,j)} - S_{0,Tamb(i,j)}}{Resp_{(i,j)}} + T_{amb} \quad (9)$$

The processing thus carried out on the raw image allows a temperature-compensated final image that is free from pixelization effect and columnar aspect to be obtained.

The present invention also relates to a computer program that, when it is implemented by a computer, allows the processing method according to the present invention to be executed.

The invention furthermore relates to an imager provided with active bolometers $B_{pix\_}(i,j)$ arranged in a matrix array of n rows $L_i$ and m columns $C_j$;

blind bolometers $B_{b\_}(k)$, each blind bolometer $P_{b\_}(k)$ being employed for the differential measurement of the active bolometers $B_{pix\_}(i,j)$ of at least one column of bolometers that is specific thereto, each blind bolometer $B_{b\_}(k)$ advantageously being associated with a single column ($C_j$) of active bolometers $B_{pix\_}(i,j)$;

a computer equipped with the computer program.

Lastly, the invention also relates to a method of using the imager according to the present invention for detection, in particular the detection of people, in a room.

The invention claimed is:

1. Method for processing a raw image characterized by raw measurements $S_p(i,j)$ that are associated with active bolometers $B_{pix\_}(i,j)$ of an imager, which bolometers are arranged in a matrix array of n rows ($L_i$) and m columns ($C_j$), the imager being at an ambient temperature $T_{amb}$ and furthermore comprising blind bolometers $B_{b\_}(k)$, each blind bolometer $B_{b\_}(k)$ being employed for the differential measurement of the active bolometers $B_{pix\_}(i,j)$ of at least one column of bolometers that is specific thereto, each blind bolometer $B_{b\_}(k)$ advantageously being associated with one single column ($C_j$) of active bolometers $B_{pix\_}(i,j)$, the method, which is executed by a computer that is provided with a memory, comprising the following steps:

a) a step of calculating the electrical resistances $R_{Tc}(i,j)$ and $R_{Tc}(k)$, at the temperature $T_{amb}$, of the active and blind bolometers, respectively, from their respective electrical resistances $R_{Tr}(i,j)$ and $R_{Tr}(k)$ at a reference temperature $T_r$, said resistances being stored in the memory; and b) a step of determining the temperatures $T_{sc}(i,j)$ actually measured by each of the active bolometers $B_{pix\_}(i,j)$ from the electrical resistances calculated in step a) and from the raw measurements $S_p(i,j)$, wherein the temperature $T_{sc}(i,j)$ actually measured by an active bolometer $B_{pix\_}(i,j)$ respects the following relationship:

$$S_P(i,j) = \text{Resp}(T_{amb},i,j)(T_{sc}(i,j) - T_{amb}) + S_{0,Tamb}(i,j)$$

where:

$\text{Resp}(T_c,i,j)$ is the responsivity of the bolometer, wherein term $(T_c,i,j)$ represents term $(T_{amb},i,j)(T_{sc}(i,j) - T_{amb})$;

$S_{0,Tamb}(i,j)$ is the value output by the active bolometer $B_{pix\_}(i,j)$ without any output provided by the blind bolometers, for a temperature actually measured equal to the ambient temperature.

2. Method according to claim 1, wherein step a) of calculating the electrical resistances $R_{Tc}(i,j)$ and $R_{Tc}(k)$, at the temperature $T_{amb}$, is executed based on an activation energy $E_a$ representative of the material forming each of the active and blind bolometers $B_{pix\_}(i,j)$ and $B_{b\_}(k)$.

3. Method according to claim 2, wherein the electrical resistances $R_{Tamb}(i,j)$ and $R_{Tamb}(k)$ are calculated using the following relationships:

$$R_{Tamb}(i, j) = R_{Tr}(i, j) \cdot e^{\frac{qE_a}{k}\left(\frac{1}{T_{amb}} - \frac{1}{T_r}\right)}$$

and $$R_{Tamb}(k) = R_{Tr}(k) \cdot e^{\frac{qE_a}{k}\left(\frac{1}{T_{amb}} - \frac{1}{T_r}\right)}$$

4. Method according to claim 1, wherein the value $S_{0,Tamb}(i,j)$ associated with an active bolometer $B_{pix\_}(i,j)$ of a column $(C_j)$ is dependent on the difference between the currents $I_{0,pix}(i,j)$ and $I_{0,b}(j)$ capable of flowing through said active bolometer $B_{pix\_}(i,j)$ and the blind bolometer $B_{b\_}(k)$ with which the column $(Cj)$ is associated, respectively, for a temperature actually measured equal to the ambient temperature.

5. Method according to claim 1, step a) being preceded by a step a1) of acquiring raw measurements $S_p(i,j)$ with capacitive transimpedance amplifiers (CTIA) that are arranged so that all of the active bolometers $B_{pix\_}(i,j)$ of each column $(C_j)$ and the blind bolometer $B_{b\_}(k)$ with which said column $(Cj)$ is associated are connected to a negative input $(E^-)$ of one of the capacitive transimpedance amplifiers (CTIA), the positive input $(E^+)$ of said amplifier (CTIA) receiving a reference voltage $(V_{bus})$.

6. Method according to claim 5, wherein switching devices, in particular transistors, controlled by the computer are interposed between each of the, active and blind, bolometers and the capacitive transimpedance amplifier (CTIA) to which the latter are connected.

7. Method according to claim 6, wherein prior to the implementation of the method, a step of measuring the electrical resistances $R_{Tr}(i,j)$ and $R_{Tr}(k)$ is executed.

8. Method according to claim 7, wherein the determination of the electrical resistance $R_{Tr}(i,j)$ and $R_{Tr}(k)$ of an active bolometer $B_{pix\_}(i,j)$ of a column (Cj) or of the blind bolometer $B_{b\_}(k)$ with which said column (Cj) is associated comprises a measurement of the current capable of flowing through the bolometer in question.

9. Method according to claim 8, wherein the measurement of the current capable of flowing through the bolometer in question comprises closing the switch interposed between said bolometer in question and the capacitive transimpedance amplifier (CTIA), the other switches being kept open.

10. A computer program product comprising a non-transitory computer readable medium having a computer program stored thereon, which when executed by a computer, causes the method according to claim 1 to be performed.

11. Imager comprising,
    active bolometers $B_{pix\_}(i,j)$, of an imager, said bolometers being arranged in a matrix array of n rows $(L_i)$ and m columns $(C_j)$;
    blind bolometers $B_{b\_}(k)$, each blind bolometer $B_{b\_}(k)$ being employed for the differential measurement of the active bolometers $B_{pix\_}(i,j)$ of at least one column of bolometers that is specific thereto, each blind bolometer $B_{b\_}(k)$ advantageously being associated with a single column $(C_j)$ of active bolometers $B_{pix\_}(i,j)$; and
    a computer comprising a non-transitory computer readable medium having a computer program stored thereon, which when executed by the computer causes the method according to claim 1 to be performed.

12. Imager according to claim 11, wherein the imager is used for detection of people in a room.

\* \* \* \* \*